(12) United States Patent
Zou et al.

(10) Patent No.: US 10,560,200 B2
(45) Date of Patent: Feb. 11, 2020

(54) OPTICAL MODULE FOR DYNAMICALLY ADJUSTING OPTICAL POWER RECEIVING RANGE

(71) Applicant: HUAWEI TECHNOLOGIES CO., LTD., Shenzhen, Guangdong (CN)

(72) Inventors: Shilei Zou, Shenzhen (CN); Bingsen Liu, Shenzhen (CN); Qiwen Wei, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/313,998

(22) PCT Filed: Jun. 30, 2016

(86) PCT No.: PCT/CN2016/087923
§ 371 (c)(1),
(2) Date: Dec. 28, 2018

(87) PCT Pub. No.: WO2018/000340
PCT Pub. Date: Jan. 4, 2018

(65) Prior Publication Data
US 2019/0334629 A1    Oct. 31, 2019

(51) Int. Cl.
*H04B 10/80* (2013.01)
*H04B 10/564* (2013.01)
(Continued)

(52) U.S. Cl.
CPC ......... *H04B 10/806* (2013.01); *H04B 10/564* (2013.01); *H04B 10/67* (2013.01);
(Continued)

(58) Field of Classification Search
CPC ..... H04B 10/806; H04B 10/564; H04B 10/67
(Continued)

(56) References Cited

U.S. PATENT DOCUMENTS 4,316,467 A * 2/1982 Muckerheide ....... A61B 18/203
  219/121.62
9,882,069 B2 * 1/2018 Wang ................ H01L 31/02027
(Continued)

FOREIGN PATENT DOCUMENTS

CN    101247182 A    8/2008
CN    102752046 A    10/2012
(Continued)

OTHER PUBLICATIONS

International Search Report and Written Opinion issued in International Application No. PCT/CN2016/087923 dated Mar. 16, 2017, 19 pages.

*Primary Examiner* — Abbas H Alagheband
(74) *Attorney, Agent, or Firm* — Fish & Richardson P.C.

(57) ABSTRACT

A technology of dynamically adjusting an optical power receiving range of an optical module in a passive optical network is provided. In an optical module it includes an optical signal receive end receives an optical signal, an avalanche photodiode converts the optical signal into an optical current, an optical power detection module obtains an optical power value of the optical current, a main control chip adjusts a resistance value of a variable feedback resistor circuit according to the optical power value, and a transconductance amplifier outputs a voltage according to the resistance value of the variable feedback resistor circuit and the optical current. In this way, a bit error rate is effectively reduced, an optical power receiving range of the optical module is expanded, and system robustness is enhanced.

17 Claims, 5 Drawing Sheets

(51) Int. Cl.
*H04B 10/67* (2013.01)
*H04B 10/69* (2013.01)
*H04B 10/272* (2013.01)
*H04L 7/027* (2006.01)

(52) U.S. Cl.
CPC ........ *H04B 10/272* (2013.01); *H04B 10/6911* (2013.01); *H04L 7/027* (2013.01)

(58) Field of Classification Search
USPC .......................................................... 398/162
See application file for complete search history.

(56) References Cited

U.S. PATENT DOCUMENTS

| | | | | |
|---|---|---|---|---|
| 10,003,410 | B2* | 6/2018 | Mita | H03F 3/08 |
| 2007/0189768 | A1* | 8/2007 | Yang | H04B 10/40 |
| | | | | 398/38 |
| 2010/0119240 | A1* | 5/2010 | Feng | H04B 10/69 |
| | | | | 398/202 |
| 2011/0222867 | A1* | 9/2011 | Dietz | H03F 3/087 |
| | | | | 398/203 |
| 2012/0141122 | A1* | 6/2012 | Carusone | H04B 10/6971 |
| | | | | 398/37 |
| 2014/0099105 | A1* | 4/2014 | Yan | H04B 10/0799 |
| | | | | 398/38 |

FOREIGN PATENT DOCUMENTS

| | | |
|---|---|---|
| CN | 102904647 A | 1/2013 |
| CN | 103338077 A | 10/2013 |
| CN | 203618000 U | 5/2014 |
| CN | 104901744 A | 9/2015 |

* cited by examiner

OPTICAL MODULE FOR DYNAMICALLY ADJUSTING OPTICAL POWER RECEIVING RANGE

CROSS-REFERENCE TO RELATED APPLICATION

This application is a national stage of International Application No. PCT/CN2016/087923, filed on Jun. 30, 2016, which is hereby incorporated by reference in its entirety.

TECHNICAL FIELD

The present invention relates to the field of optical communication, and in particular, to a technology of dynamically adjusting an optical power receiving range of an OLT optical module in a passive optical network.

BACKGROUND

In a passive optical network (Passive Optical Network, PON for short) system, one optical line terminal (optical line terminal, OLT for short) is connected to a plurality of optical network units (optical network unit, ONU for short).

In an actual environment, a distance between each ONU and the OLT differs greatly, and light attenuation of each ONU varies. Therefore, there is a large difference between optical power of ONUs received by a same OLT port, and there is also a large difference between optical power that is of the OLT and that is received by ONUs of a same OLT port. As a result, a receiving part of an optical module in the OLT or the ONU needs to support a relatively large optical power receiving range to adapt to application in the actual environment.

Currently, in the PON system, an optical power receiving range of the OLT is from −8 dBm to −28 dBm, and an optical power receiving range of the ONU is from −8 dBm to −27 dBm. However, in actual application, optical power receiving ranges of most OLTs or ONUs reach a threshold of the foregoing range or exceed the foregoing range due to an actual environment, a component arrangement, and the like, resulting in service interruption.

Currently, FIG. 1 shows an optical module in an OLT or an ONU (only a receiving part is shown). The optical module includes an optical signal receive end, an avalanche photodiode, a transconductance amplifier, and a feedback resistor R1. The optical signal receive end is connected to a negative electrode of the avalanche photodiode, a positive electrode of the avalanche photodiode is connected to a negative input end of the transconductance amplifier, a first end of the feedback resistor R1 is connected to the negative input end of the transconductance amplifier, a second end of the feedback resistor R1 is connected to an output end of the transconductance amplifier, and a positive input end of the transconductance amplifier is grounded.

After receiving an optical signal, the optical signal receive end transmits the optical signal to the avalanche photodiode. The avalanche photodiode generates an optical current I after receiving the optical signal. A value of the optical current is in direct proportion to an optical intensity value of the received optical signal. The avalanche photodiode transmits the optical current I to the negative input end of the transconductance amplifier. The transconductance amplifier generates an output voltage $U_{out}=I*R1$ after the optical current I passes through the transconductance amplifier and the feedback resistor R1. The output voltage is provided for a subsequent limiting amplifier to perform voltage amplitude processing.

However, the receiving part of the optical module has the following disadvantage: Because configuration of the feedback resistor R1 is fixed in a product, an optical power receiving range of the receiving part of the optical module is also fixed. However, in actual application, optical power received by the OLT or the ONU may exceed the fixed optical power range, resulting in a bit error in actual application.

SUMMARY

The present invention provides an optical module for dynamically adjusting an optical power receiving range, so as to adjust a received optical power receiving range and reduce a bit error rate.

According to one aspect, an embodiment of the present invention provides an optical module for dynamically adjusting an optical power receiving range. A function of the optical module may be implemented by hardware, and the hardware includes one or more functional modules.

The optical module includes an optical signal receive end, a transconductance amplifier, and an avalanche photodiode. A circuit further includes a main control chip, an optical power detection module, and a variable feedback resistor circuit. The optical signal receive end is connected to a negative electrode of the avalanche photodiode, a positive electrode of the avalanche photodiode is separately connected to a first end of the optical power detection module and a negative input end of the transconductance amplifier, and a positive input end of the transconductance amplifier is grounded. The variable feedback resistor circuit is connected between the negative input end and an output end that are of the transconductance amplifier, a first end of the main control chip is connected to the variable feedback resistor circuit, and a second end of the main control chip is connected to a second end of the power detection module.

The optical signal receive end is configured to: receive an optical signal, and transmit the optical signal to the avalanche photodiode. The avalanche photodiode is configured to: convert the received optical signal into an optical current, and transmit the optical current to the optical power detection module and the transconductance amplifier. The optical power detection module is configured to: obtain, according to the received optical current, an optical power value corresponding to the optical current, and transmit the optical power value to the main control chip. The main control chip is configured to adjust a resistance value of the variable feedback resistor circuit according to the received optical power value. The transconductance amplifier is configured to output a voltage according to the resistance value of the variable feedback resistor circuit and the optical current.

In a PON system, the optical module adjusts the resistance value of the variable feedback resistor circuit according to the optical power value, and controls an output voltage $U_{out}$ to be in a proper range. In this way, a bit error rate is effectively reduced, an optical power receiving range of the optical module is expanded, and system robustness is enhanced.

In a possible design, the variable feedback resistor circuit includes a first field-effect transistor and a first resistor, and the first field-effect transistor is set to a partially conducted state.

A source of the first field-effect transistor and a first end of the first resistor are separately connected to the negative input end of the transconductance amplifier, a drain of the first field-effect transistor and a second end of the first resistor are separately connected to the output end of the transconductance amplifier, and a gate of the first field-effect transistor is connected to the first end of the main control chip.

Because the first field-effect transistor may be equivalent to different resistors, the variable feedback resistor circuit is implemented by using the first field-effect transistor and the first resistor, so that the resistance value of the variable feedback resistor circuit can be dynamically adjusted, the voltage output by the transconductance amplifier changes accordingly, and the optical power receiving range of the optical module is flexibly expanded.

In a possible design, the variable feedback resistor circuit includes a first resistor, a second resistor, and a first switch. The first switch is configured to control a status of a connection between the second resistor and the first resistor.

A first end of the first resistor and a first end of the second resistor are separately connected to the negative input end of the transconductance amplifier, a second end of the first resistor is connected to the output end of the transconductance amplifier, a second end of the second resistor is connected to an input end of the first switch, an output end of the first switch is connected to the output end of the transconductance amplifier, and a control end of the first switch is connected to the first end of the main control chip.

The main control chip controls the first switch to be turned on or turned off, so that the second resistor is connected to the optical module or not. In this way, the resistance value of the variable feedback resistor circuit is dynamically adjusted, the voltage output by the transconductance amplifier changes accordingly, and the optical power receiving range of the optical module is flexibly expanded. In addition, costs of the optical module can be reduced by adjusting access of a resistor by using a switch.

In a possible design, the main control chip is specifically configured to: determine whether the optical power value is greater than a preset first power threshold; connect the control end of the first switch to the output end of the switch if the optical power value is greater than the first power threshold; or disconnect the control end of the first switch from the output end of the switch if the optical power value is not greater than the first power threshold.

The main control chip controls, according to a result of comparison between the optical power value and the first power threshold, the first switch to be turned on or turned off, so that the second resistor is connected to the optical module or not. In this way, the resistance value of the variable feedback resistor circuit is dynamically adjusted, the voltage output by the transconductance amplifier changes accordingly, and the optical power receiving range of the optical module is flexibly expanded.

In a possible design, the first switch is specifically a second field-effect transistor.

The first end of the first resistor is connected to the negative input end of the transconductance amplifier, the second end of the first resistor is connected to the output end of the transconductance amplifier, the first end of the second resistor is connected to the negative input end of the transconductance amplifier, the second end of the second resistor is connected to a source of the second field-effect transistor, a drain of the second field-effect transistor is connected to the output end of the transconductance amplifier, and a gate of the second field-effect transistor is connected to the first end of the main control chip.

The main control chip is specifically configured to: determine whether the optical power threshold is greater than the preset first power threshold; set the second field-effect transistor to a conducted state if the optical power value is greater than the first power threshold; or set the second field-effect transistor to a cut-off state if the optical power value is not greater than the first power threshold.

The main control chip can more quickly and flexibly adjust the resistance value of the variable feedback resistor circuit by using a field-effect transistor as a switch, so that the voltage output by the transconductance amplifier changes accordingly. In addition, the main control chip controls, according to the result of the comparison between the optical power and the first power threshold, the second field-effect transistor to be conducted or cut off, so that the second resistor is connected to the optical module or not. In this way, the resistance value of the variable feedback resistor circuit is dynamically adjusted, and the optical power receiving range of the optical module is expanded.

In a possible design, the variable feedback resistor circuit further includes a third resistor and a second switch. The second switch is configured to control a status of a connection between the third resistor and each of the first resistor and the second resistor.

A first end of the third resistor is separately connected to the first end of the first resistor, the first end of the second resistor, and the negative input end of the transconductance amplifier, the second end of the first resistor is connected to the output end of the transconductance amplifier, the second end of the second resistor is connected to the input end of the first switch, the output end of the first switch is connected to the output end of the transconductance amplifier, the control end of the first switch is connected to the first end of the main control chip, a second end of the third resistor is connected to an input end of the second switch, an output end of the second switch is connected to the output end of the transconductance amplifier, and a control end of the second switch is connected to a third end of the main control chip.

A plurality of switches control a plurality of resistors to be connected to the optical module in parallel. In this way, the optical receiving range of the optical module is further expanded, and a design requirement of the optical module is met, so that the optical module can still work normally when receiving relatively high or low optical power, and a probability that optical receive power is saturated and optical receive power fails to be identified is reduced.

In a possible design, the main control chip is specifically configured to: determine a value relationship between the optical power value and each of a preset first power threshold and a preset second power threshold; and if the optical power value is not greater than the first power threshold, disconnect the control end of the first switch from the output end of the first switch, and disconnect the control end of the second switch from the output end of the second switch; if the optical power value is greater than the first power threshold and not greater than the second power threshold, connect the control end of the first switch to the output end of the switch, and disconnect the control end of the second switch from the output end of the second switch; or if the optical power value is greater than the second power threshold, connect the control end of the first switch to the output end of the first switch, and connect the control end of the second switch to the output end of the second switch.

The main control chip controls, according to a result of comparison between the optical power value and a plurality of power thresholds, the first switch and the second switch to be turned on or turned off, so that the second resistor and the third resistor are connected to the optical module or not. In this way, the optical receiving range of the optical module is further expanded, and a design requirement of the optical module is met, so that the optical module can still work normally when receiving relatively high or low optical power, and the probability that optical receive power is saturated and optical receive power fails to be identified is further reduced.

In a possible design, the first switch is specifically a second field-effect transistor, and the second switch is specifically a third field-effect transistor.

The first end of the first resistor, the first end of the second resistor, and the first end of the third resistor are separately connected to the negative input end of the transconductance amplifier, the second end of the first resistor is connected to the output end of the transconductance amplifier, the second end of the second resistor is connected to a source of the second field-effect transistor, a drain of the second field-effect transistor is connected to the output end of the transconductance amplifier, a gate of the second field-effect transistor is connected to the first end of the main control chip, the second end of the third resistor is connected to a source of the third field-effect transistor, a drain of the third field-effect transistor is connected to the output end of the transconductance amplifier, and a gate of the third field-effect transistor is connected to the third end of the main control chip.

The main control chip is specifically configured to: determine the value relationship between the optical power value and each of the preset first power threshold and the preset second power threshold; and if the optical power value is not greater than the first power threshold, set the second field-effect transistor to a cut-off state, and set the third field-effect transistor to a cut-off state; if the optical power value is greater than the first power threshold and not greater than the second power threshold, set the second field-effect transistor to a conducted state, and set the third field-effect transistor to a cut-off state; or if the optical power value is greater than the second power threshold, set the second field-effect transistor to a conducted state, and set the third field-effect transistor to a conducted state.

The main control chip can more quickly and flexibly adjust the resistance value of the variable feedback resistor circuit by using a field-effect transistor as a switch, so that the voltage output by the transconductance amplifier changes accordingly. In addition, the main control chip controls, according to the result of the comparison between the optical power value and the plurality of power thresholds, a plurality of field-effect transistors to be conducted or cut off, so that the second resistor and the third resistor are connected to the optical module or not. In this way, the resistance value of the variable feedback resistor circuit is dynamically adjusted, and the optical power receiving range of the optical module is expanded.

In a possible design, the main control chip is specifically configured to: obtain a correspondence table between the optical power value and a gate voltage of the first field-effect transistor; obtain the gate voltage of the first field-effect transistor according to the correspondence table; and load the obtained gate voltage into the gate of the first field-effect transistor.

The main control chip obtains the gate voltage of the first field-effect transistor by using the correspondence table between the optical power value and the gate voltage of the first field-effect transistor, so as to load the gate voltage of the first field-effect transistor. In this way, the first field-effect transistor is equivalent to a resistance value, so that the resistance value of the variable feedback resistor circuit is dynamically adjusted, the voltage output by the transconductance amplifier changes accordingly, and the optical power receiving range of the optical module is flexibly expanded.

In a possible design, the circuit further includes a fixed resistor.

A first end of the fixed resistor is connected to the first end of the main control chip, and a second end of the fixed resistor is connected to the gate of the first field-effect transistor.

The fixed resistor R may be configured to maintain a constant voltage of a signal output by the main control chip.

According to another aspect, an embodiment of the present invention provides an optical line terminal OLT, and the OLT includes the optical module provided in the foregoing aspect.

According to still another aspect, an embodiment of the present invention provides an optical network unit ONU, and the ONU includes the optical module provided in the foregoing aspect.

In comparison with the prior art, the solutions provided in the present invention can more flexibly expand the optical power receiving range of the optical module, reduce a bit error rate, and increase receiving sensitivity and a saturated optical receive power indicator.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and a person of ordinary skill in the art can derive other implementations from these accompanying drawings without creative efforts. All of the embodiments or the implementations shall fall within the protection scope of the present invention.

DESCRIPTION OF EMBODIMENTS

The technical solutions according to embodiments of the present invention are clearly and completely described in the following with reference to the accompanying drawings. Apparently, the described embodiments are merely some but not all of the embodiments of the present invention. All other embodiments obtained by a person of ordinary skill in the art based on the embodiments of the present invention without creative efforts shall fall within the protection scope of the present invention.

Network architectures and service scenarios described in the embodiments of the present invention are used to describe the technical solutions in the embodiments of the present invention more clearly, but are not intended to limit the technical solutions provided in the embodiments of the present invention. A person of ordinary skill in the art may understand that with evolution of the network architecture and appearance of a new service scenario, the technical solutions provided in the embodiments of the present invention are also applicable to a similar technical problem.

Figure 1:
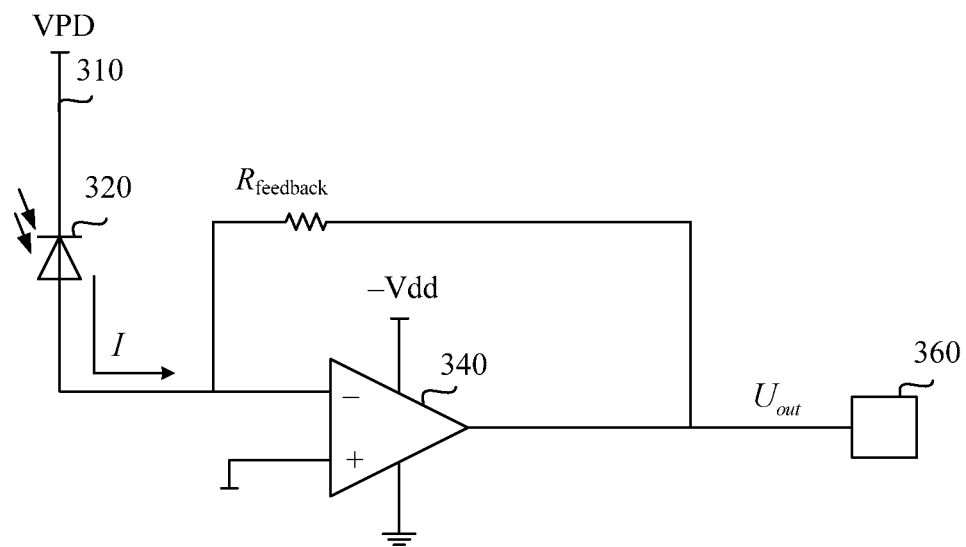
FIG. 1 is a circuit diagram of a receiving part of an optical module in the prior art.
Figure 2:
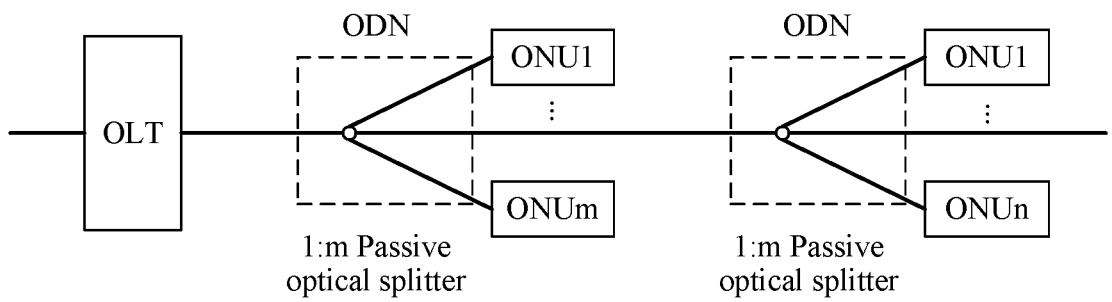
FIG. 2 is a schematic diagram of a PON system according to an embodiment of the present invention.

FIG. 2 is a schematic diagram of a PON system according to an embodiment of the present invention. The PON system mainly includes an OLT, at least one optical distribution network (optical distribution network, ODN for short), and at least one ONU. In the PON system, one OLT may simultaneously transmit an optical signal to at least one ONU. The OLT sends Ethernet data to the at least one ONU in a broadcast manner, and allocates an uplink light-emitting timeslot to each ONU in each uplink frame. Each ONU receives broadcast data sent by the OLT, and sends an optical signal to the OLT in the allocated uplink light-emitting timeslot. The ODN is configured to provide an optical transmission channel between the OLT and the ONU.

Both the OLT and the ONU include an optical module for dynamically adjusting an optical power receiving range. By using the optical module for dynamically adjusting an optical power receiving range, the OLT or the ONU receives an optical signal sent by each other, and converts the optical signal into an electrical signal, so as to obtain corresponding data or information.

The following further describes this embodiment of the present invention in detail based on commonalities of the present invention described above.

In this embodiment of the present invention, the optical module for dynamically adjusting an optical power receiving range and that is included in the OLT is used as an example for description. It may be understood that the ONU may also include the optical module for dynamically adjusting an optical power receiving range, and principles thereof are the same.

The OLT allocates, in each uplink frame, an uplink light-emitting timeslot to each ONU connected to the OLT. Each ONU sends an optical signal to the OLT in the allocated uplink light-emitting timeslot. That the optical module in the OLT receives an optical signal sent by an ONU is used as an example for description below.

Figure 3:
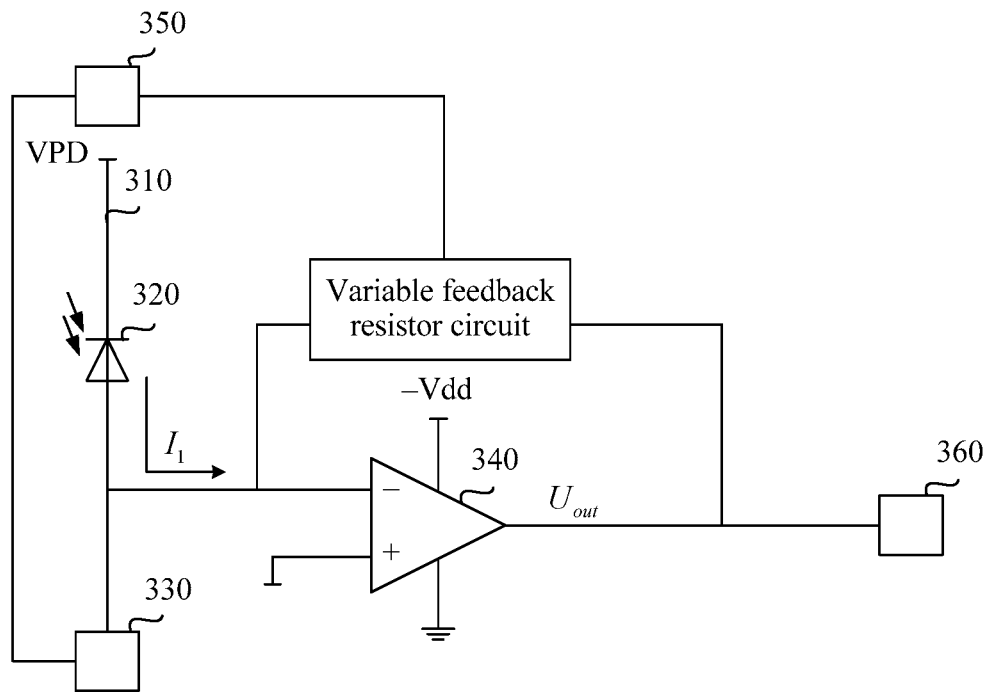
FIG. 3 is a circuit diagram of a receiving part of an optical module for dynamically adjusting an optical power receiving range according to an embodiment of the present invention.

FIG. 3 is a circuit diagram of a receiving part of an optical module for dynamically adjusting an optical power receiving range according to an embodiment of the present invention. The optical module includes an optical signal receive end 310, an avalanche photodiode 320, and a transconductance amplifier 340.

In this embodiment of the present invention, the circuit further includes an optical power detection module 330, a main control chip 350, and a variable feedback resistor circuit.

A reverse high voltage VPD of the optical signal receive end 310 is connected to a negative electrode of the avalanche photodiode 320, a positive electrode of the avalanche photodiode 320 is separately connected to a first end of the optical power detection module 330 and a negative input end of the transconductance amplifier 340, and a positive input end of the transconductance amplifier 340 is grounded. The variable feedback resistor circuit is connected between the negative input end of the transconductance amplifier 340 and an output end of the transconductance amplifier 340. A first end of the main control chip 350 is connected to the variable feedback resistor circuit, and a second end of the main control chip 350 is connected to a second end of the power detection module 330.

In a PON system, the optical module adjusts a resistance value of the variable feedback resistor circuit according to an optical power value, and controls an output voltage $U_{out}$ to be in a proper range. In this way, a bit error rate is effectively reduced, an optical power receiving range of the optical module is expanded, and system robustness is enhanced.

In this embodiment of the present invention, the optical signal receive end 310 is configured to: receive an optical signal, and transmit the optical signal to the avalanche photodiode 320. The optical signal receive end in FIG. 3 includes the reverse high voltage VPD of the optical signal receive end.

The avalanche photodiode 320 is configured to: convert the received optical signal into an optical current, and transmit the optical current to the optical power detection module 330 and the transconductance amplifier 340.

The optical power detection module 330 is configured to: obtain, according to the received optical current, an optical power value corresponding to the optical current, and transmit the optical power value to the main control chip 350. The optical power detection module 330 detects the optical signal to obtain the optical power value corresponding to the optical current.

The main control chip 350 is configured to adjust a resistance value of the variable feedback resistor circuit according to the received optical power value.

In this embodiment of the present invention, the main control chip is specifically a PON MAC, and the PON MAC is a signal processing chip, and may implement a simple processing function, for example, a function of identifying a value relationship between an optical power value and a power threshold, or a function of adjusting a resistance value of a variable feedback resistor circuit. The signal processing chip may be integrated into a module in the optical module, for example, a processing module. It may be understood that the PON MAC may alternatively be integrated into an MCU of the optical module. The main control chip includes components such as a processor, a transceiver, and a memory. The processor implements various functions of the main control chip, the transceiver implements communication with another component, and the memory is configured to store program code.

The transconductance amplifier 340 is configured to output a voltage according to the resistance value of the variable feedback resistor circuit and the optical current.

In this embodiment of the present invention, the voltage $U_{out}$ output by the transconductance amplifier 340 meets the following formula 1:

$$U_{out} = I_1 * R_{variable\ feedback} \qquad \text{formula 1}$$

$I_1$ is the optical current, and $R_{variable\ feedback}$ is a variable feedback resistance.

In the optical module provided in this embodiment of the present invention, because the main control chip 350 may dynamically adjust the resistance value of the variable feedback resistor circuit according to the optical power value, and the voltage output by the transconductance amplifier 340 changes as the resistance value of the variable feedback resistor circuit is adjusted, so that the optical module can still work normally when receiving relatively high or low optical power. The optical power receiving range of the optical module can be expanded by using the circuit for dynamically adjusting an optical power receiving range provided in this embodiment of the present invention, so as to increase receiving sensitivity and a saturated optical receive power indicator.

Further, the optical module further includes a limiting amplifier 360. An input end of the limiting amplifier 360 is connected to the output end of the transconductance amplifier 340.

The limiting amplifier 360 receives the voltage $U_{out}$ output by the transconductance amplifier 340, and adjusts a voltage amplitude of the voltage $U_{out}$. The limiting amplifier 360 eliminates an excessively high or excessively low voltage value of the voltage $U_{out}$, so that the circuit can work normally without being affected by the excessively high or excessively low voltage.

Figure 4:
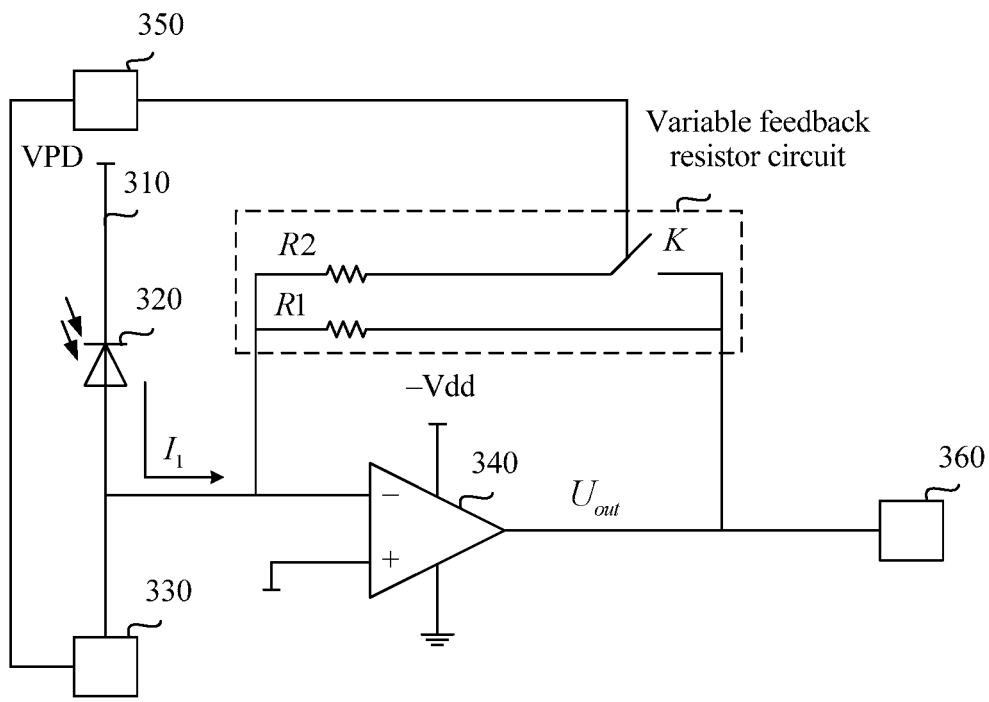
FIG. 4 is a circuit diagram of a receiving part of another optical module for dynamically adjusting an optical power receiving range according to an embodiment of the present invention.

The following describes a specific circuit provided in this embodiment of the present invention with reference to FIG. 4.

FIG. 4 is a circuit diagram of a receiving part of another optical module for dynamically adjusting an optical power receiving range according to an embodiment of the present invention. FIG. 4 shows a detailed structure of the variable feedback resistor circuit based on FIG. 3. For a part that is the same as that in FIG. 3, refer to the description of FIG. 3. Details are not described herein again.

In this embodiment of the present invention, the variable feedback resistor circuit includes a first resistor R1, a second resistor R2, and a first switch K1.

Optionally, the first switch K1 includes an input end, an output end, and a control end. A first end of the first resistor R1 and a first end of the second resistor R2 are separately connected to the negative input end of the transconductance amplifier 340, and a second end of the first resistor R1 is connected to the output end of the transconductance amplifier 340. A second end of the second resistor R2 is connected to the input end of the first switch K1, the output end of the first switch K1 is connected to the output end of the transconductance amplifier 340, and the control end of the first switch K1 is connected to the first end of the main control chip 330. It should be noted that when the control end and the output end of the first switch K1 are connected, the variable feedback resistor circuit includes the first resistor R1 and the second resistor R2 connected in parallel. When the control end and the output end of the first switch K1 are disconnected, the variable feedback resistor circuit includes the first resistor R1.

The main control chip 350 dynamically adjusts the resistance value of the variable feedback resistor circuit by controlling the first switch K1 to be turned on or turned off, so that the voltage $U_{out}$ output by the transconductance amplifier 340 changes accordingly. In this way, the optical power receiving range of the optical module can be expanded, optical receiving sensitivity of the optical module can be increased, and a probability that optical receive power is saturated and optical receive power fails to be identified can be reduced. In addition, in this embodiment of the present invention, costs of the optical module can be reduced by adjusting access of a resistor by using a switch.

Specifically, the main control chip 330 connects the control end of the first switch K1 to the output end of the first switch K1 when the optical power value is greater than a first power threshold, and the main control chip 330 disconnects the control end of the first switch K1 from the output end of the first switch K1 when the optical power value is not greater than the first power threshold.

It should be noted that the first power threshold is a preset value, and specifically, the value may be flexibly set according to an actual situation. This is not specifically limited in this embodiment of the present invention.

In this embodiment of the present invention, the processor in the main control chip 330 outputs a digital signal after comparing the optical power value with the first power threshold. The transceiver in the main control chip 330 outputs the digital signal to the control end of the first switch K1 to control connection or disconnection between the control end and the output end of the first switch K1. For example, when the main control chip 330 outputs 1, the control end and the output end of the first switch K1 are connected, and when the main control chip 330 outputs 0, the control end and the output end of the first switch K1 are disconnected.

Optionally, the first switch K1 may be implemented by a metal-oxide semiconductor field-effect transistor (metal-oxide semiconductor field effect transistor, MOS-FET for short).

In this case, the first end of the first resistor R1 is connected to the negative input end of the transconductance amplifier 340, the second end of the first resistor R1 is connected to the output end of the transconductance amplifier 340, the first end of the second resistor R2 is connected to the negative input end of the transconductance amplifier 340, the second end of the second resistor R2 is connected to a source of a field-effect transistor, a drain of the field-effect transistor is connected to the output end of the transconductance amplifier 340, and a gate of the field-effect transistor is connected to the first end of the main control chip 350 (the field-effect transistor is not shown in FIG. 4).

Further, the main control chip 350 is specifically configured to control, according to a result of the comparison between the optical power value and the first power threshold, the field-effect transistor to be in a conducted state or a cut-off state. In this way, the second resistor R2 is connected to the circuit in parallel by controlling the field-effect transistor to be in a conducted state or a cut-off state.

For example, the main control chip 330 compares the optical power value of the received optical signal with the first power threshold. When the optical power value is greater than the first power threshold, the main control chip 330 sets the field-effect transistor to a conducted state. In this case, the second resistor R2 and the first resistor R1 are connected in parallel, and a combination of the second resistor R2 and the first resistor R1 connected in parallel is used as a feedback resistor of the transconductance amplifier 340. When the optical power value is not greater than the first power threshold, the main control chip 330 sets the field-effect transistor to a cut-off state. In this case, the second resistor R2 and the first resistor R1 are not connected in parallel, and the first resistor R1 is used as the feedback resistor of the transconductance amplifier 340.

It may be understood that the digital signal output by the processor in the main control chip 330 may be further used to control the field-effect transistor to be conducted or cut off. For example, the field-effect transistor is conducted when the main control chip 330 outputs 1, and the field-effect transistor is cut off when the main control chip 330 outputs 0.

That the optical module receives an optical signal sent by one ONU is described in the foregoing embodiment. In actual application, the optical module may simultaneously receive optical signals sent by a plurality of ONUs connected to the optical module. When the optical module receives the optical signals sent by the plurality of ONUs, the main control chip 330 further records a setting status that is of the first switch K1 and that is corresponding to each ONU. The main control chip 330 restores the setting status of the first switch K1 when receiving another optical signal sent by the ONU. When the ONU goes offline, the main control chip 330 deletes the setting status that is of the first switch K1 and that is corresponding to the ONU. The main control chip 330 performs actions such as recording, restoration, and deletion, so that the optical module can automatically adjust a status of the first switch K1 according to the optical power value, so as to control an output range of the voltage $U_{out}$. In this way, the optical module works in an optimal state, a bit error rate is reduced, and the optical power receiving range of the optical module can be expanded.

Figure 5:
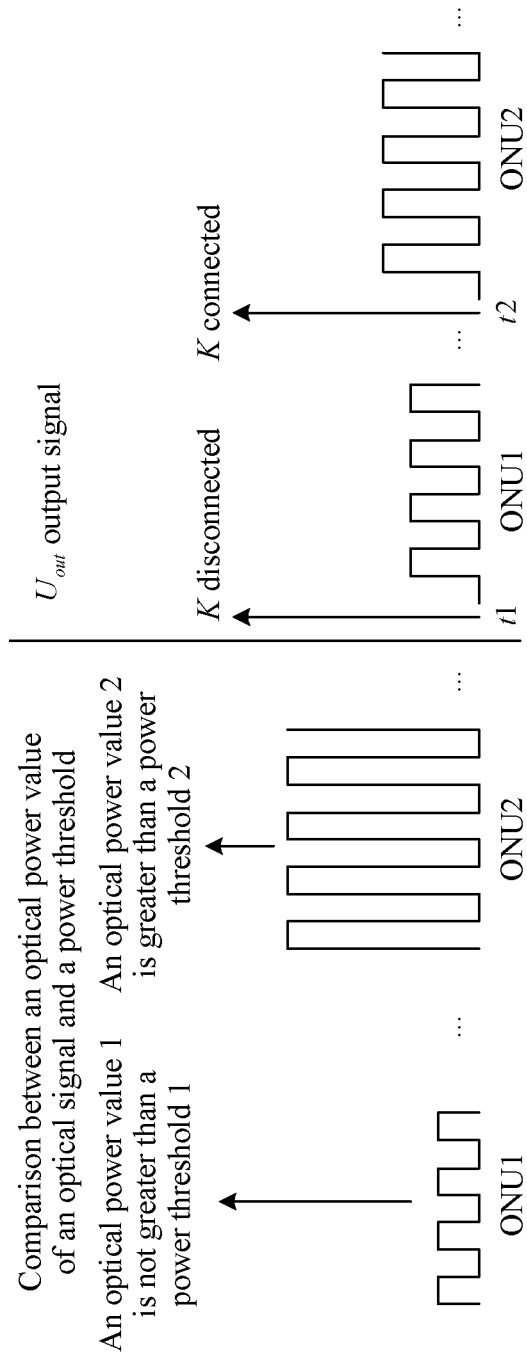
FIG. 5 is a schematic diagram of sending an optical signal by a plurality of ONUs according to an embodiment of the present invention.

For example, according to the PON protocol, an OLT allocates an uplink light-emitting timeslot to each ONU in each uplink frame. As shown in FIG. 5, in this embodiment of the present invention, the optical signal receive end 310 in the optical module receives, in an $N^{th}$ uplink frame, an optical signal 1 and an optical signal 2 that are sent by an ONU1 and an ONU2 in respective uplink light-emitting timeslots, and the main control chip 330 detects that an optical power value 1 of the optical signal 1 is not greater than a power threshold 1, and an optical power value 2 of the optical signal 2 is greater than a power threshold 2.

It may be understood that the optical module presets different power thresholds for different ONUs, and the power threshold 1 and the power threshold 2 are different power thresholds.

When the optical power value 1 is not greater than the power threshold 1, the main control chip 330 disconnects the control end of the first switch K1 from the output end of the first switch K1, that is, the second resistor R2 is not connected to the circuit. The first resistor R1 is used as the feedback resistor of the transconductance amplifier, and the main control chip 330 records a setting status that is of the first switch K1 and that is corresponding to the ONU1. When receiving, in an $(N+1)^{th}$ uplink frame, another optical signal sent by the ONU1, the main control chip 330 sets the first switch K1 according to the recorded setting of the first switch K1. When the ONU1 goes offline, the main control chip 330 deletes the setting status that is of the first switch K1 and that is corresponding to the ONU1.

Similarly, When the optical power value 2 is greater than the power threshold 2, the main control chip 330 connects the control end of the first switch K1 to the output end of the first switch K1, that is, a combination of the first resistor R1 and the second resistor R1 connected in parallel is used as the feedback resistor of the transconductance amplifier 340, and the main control chip 330 records a setting status that is of the first switch K1 and that is corresponding to the ONU2. When receiving, in an $(N+1)^{th}$ uplink frame, another optical signal sent by the ONU2, the main control chip 330 sets the first switch K1 according to the recorded setting of the first switch K1. When the ONU2 goes offline, the main control chip 330 deletes the setting status that is of the first switch K1 and that is corresponding to the ONU2. As shown in the diagram, a left side is optical power received by the OLT, and a right side is a change diagram of voltages $U_{out}$ that are corresponding to the ONU1 and the ONU2 and that are obtained after the optical module provided in this embodiment of the present invention is adjusted.

Figure 6:
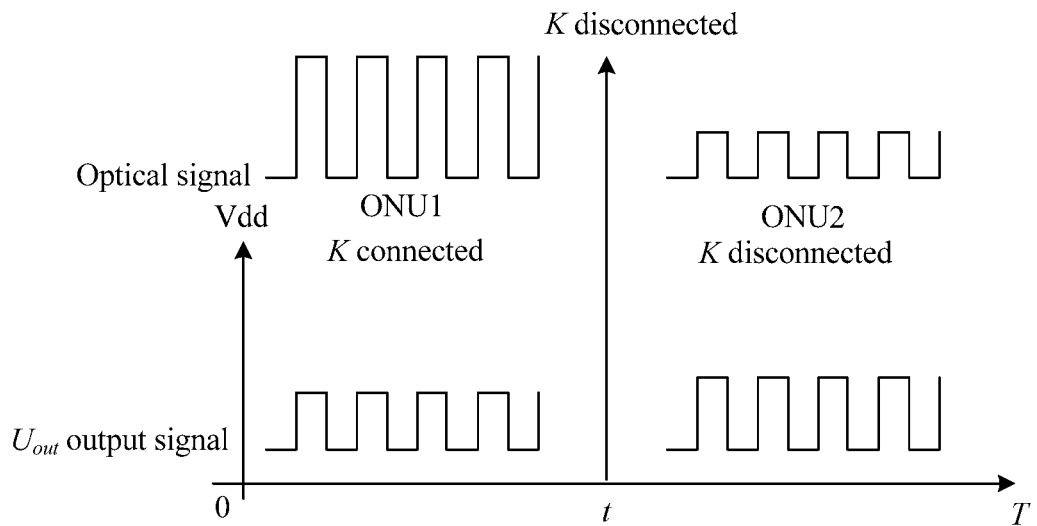
FIG. 6 is a diagram of an output voltage swing change according to an embodiment of the present invention.

In FIG. 6, a left side shows a case of an output signal at the voltage $U_{out}$ when the optical module receives an optical signal that is sent by the ONU1 and whose optical power value is greater than the power threshold 1 (referred to as high input optical power), and a right side shows a case of an output signal at the voltage $U_{out}$ when the optical module receives an optical signal that is sent by the ONU2 and whose optical power value is not greater than the power threshold 2 (referred to as low input optical power). When receiving the high input optical power sent by the ONU1, the main control chip 330 connects the control end of the first switch K1 to the output end of the first switch K1, and a combination of the first resistor R1 and the second resistor R2 connected in parallel is used as the feedback resistor of the transconductance amplifier 340, so as to control an output amplitude of the voltage $U_{out}$, thereby avoiding saturation of the output amplitude caused due to excessively high optical receive power. When receiving the low input optical power sent by the ONU2, the main control chip 330 disconnects the control end of the first switch K1 from the output end of the first switch K1 at a moment t, and the first resistor R1 is used as the feedback resistor of the transconductance amplifier 340, so as to control output amplitude of the voltage $U_{out}$, thereby avoiding a failure to identify the output amplitude caused due to excessively low optical receive power.

In this embodiment of the present invention, the first resistor R1, the second resistor R2, and the first power threshold may be preset at delivery. The following briefly describes a method for setting the first resistor R1, the second resistor R2, and the first power threshold.

A range of optical signals that can be received by the optical module is determined, that is, a minimum optical power value $P_{min}$ to a maximum optical power value $P_{max}$ in optical power values that can be obtained by the optical module ranges. The optical module can normally receive an optical signal in the range $[P_{min}, P_{max}]$. A maximum input voltage value $U_{out\_max}$ and a minimum input voltage value $U_{out\_min}$ that can be identified by the limiting amplifier 360 are determined, so that the voltage $U_{out}$ output by the transconductance amplifier 340 meets $U_{out\_min} < U_{out} < U_{out\_max}$. When the voltage $U_{out}$ falls within $[U_{out\_min}, U_{out\_max}]$, the limiting amplifier 360 can normally identify the voltage $U_{out}$, that is, identify the voltage $U_{out}$ as 0 or 1.

A minimum current value $I_{min}$ corresponding to the minimum optical power value and a maximum current value $I_{max}$ corresponding to the maximum optical power value $P_{max}$ are obtained by means of querying according to the minimum optical power value $P_{min}$ and the maximum optical power value $P_{max}$. $I_{max}$ and $I_{min}$ may be obtained from delivery data of an optical component, or current distribution data may be obtained by means of actual measurement.

A first resistance value R1 is determined according to the minimum input voltage value $U_{out\_min}$ and the minimum current value $I_{min}$, and the first resistance value R1 meets the following formula 2:

$$R1 > \frac{U_{out\_min}}{I_{min}} \qquad \text{formula 2}$$

$I_{min}*R1=1.2U_{out\_min}$ is generally determined to ensure design allowance in actual application, so that $$R1 = \frac{1.2U_{out\_min}}{I_{min}}.$$

A current threshold I of the transconductance amplifier 340 is determined by using the determined first resistance value R1 and the maximum input voltage value $U_{out\_max}$, and the current threshold I meets the following formula 3:

$$I < \frac{U_{out\_max}}{R1} \quad \text{formula 3}$$

$I*R1=0.8U_{out\_max}$ is generally determined to ensure design allowance in actual application, so that $$I = \frac{0.8U_{out\_max}}{R1}.$$

The delivery data of the optical component is queried according to the current threshold I to determine a power threshold P0 corresponding to the current threshold I.

A second resistance value R2 is determined according to the current threshold I, the maximum current value $I_{max}$, the maximum input voltage value $U_{out\_max}$, the minimum input voltage value $U_{out\_min}$, and the first resistance value R1, and the second resistance value R2 meets the following formula 6:

$$\frac{U_{out\_min}}{I} < R1 // R2 < \frac{U_{out\_max}}{I_{max}} \quad \text{formula 4}$$

When the optical power value is the power threshold P0, a first output voltage value U1 of the transconductance amplifier 340 meets the following formula 5:

$$U1=I*(R1//R2)>U_{out\_min} \quad \text{formula 5}$$

When the optical power value is the maximum optical power value $P_{max}$, a second output voltage value U2 of the transconductance amplifier 340 meets the following formula 6:

$$U2=I_{max}*(R1//R2)<U_{out\_max} \quad \text{formula 6}$$

$$R1 // R2 = \frac{\frac{U_{out\_min}}{I} + \frac{U_{out\_max}}{I_{max}}}{2}$$

is generally determined to ensure design allowance in actual application, so that the second resistance value R2 is determined according to $$R1 // R2 = \frac{\frac{U_{out\_min}}{I} + \frac{U_{out\_max}}{I_{max}}}{2}.$$

Figure 7:
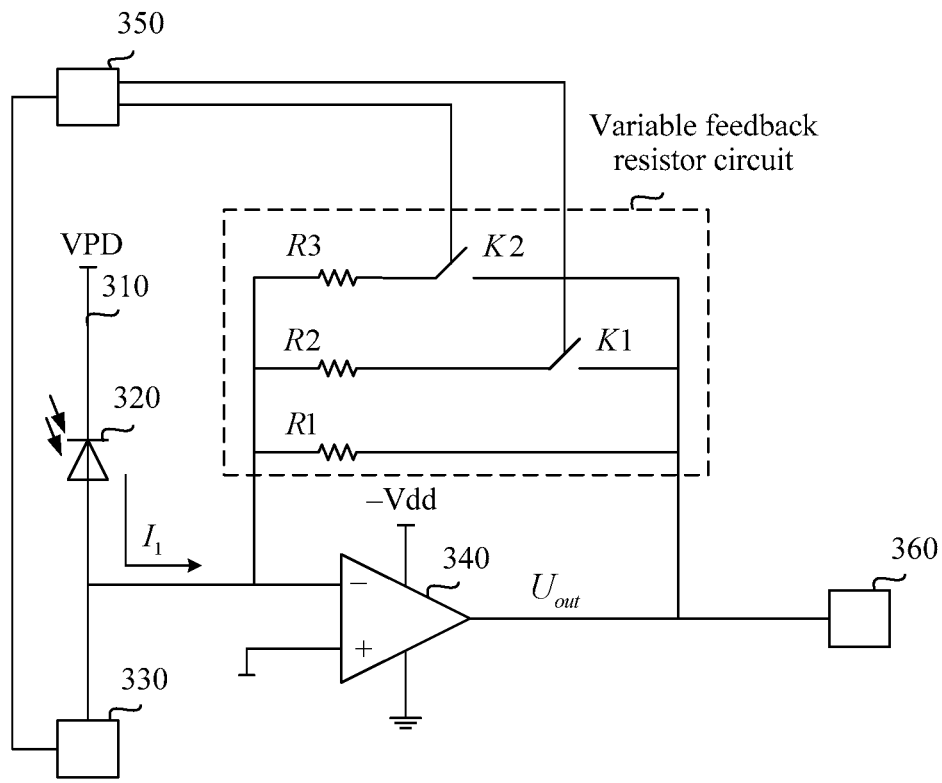
FIG. 7 is a circuit diagram of a receiving part of another optical module for dynamically adjusting an optical power receiving range according to an embodiment of the present invention.

FIG. 7 is a circuit diagram of a receiving part of another optical module for dynamically adjusting an optical power receiving range according to an embodiment of the present invention. The following describes a solution for controlling a variable feedback resistor circuit in an optical module by using a plurality of resistors and a plurality of switches with reference to FIG. 7. FIG. 7 is a structure in which a third resistor R3 and a second switch K2 are added on the basis of FIG. 4. For a part that is the same as that in FIG. 4, refer to the description of FIG. 4. Details are not described herein again.

In this embodiment of the present invention, the variable feedback resistor circuit includes the first resistor R1, the second resistor R2, the third resistor R3, the first switch K1, and the second switch K2. In the solution of the variable feedback resistor circuit in FIG. 4, the optical receiving range of the optical module is expanded to some extent, and a probability that optical receive power is saturated and optical receive power fails to be identified is reduced. In the solution of the variable feedback resistor circuit in FIG. 7, a plurality of switches are used to control a plurality of resistors to be connected in parallel. In this way, the optical receiving range of the optical module is further expanded on the basis of FIG. 4, and a design requirement of the optical module is met, so that the optical module can still work normally when receiving relatively high or low optical power, and the probability that optical receive power is saturated and optical receive power fails to be identified is further reduced.

Optionally, the second switch K2 includes an input end, an output end, and a control end. The first end of the first resistor R1, the first end of the second resistor R2, a first end of the third resistor R3 are separately connected to the negative input end of the transconductance amplifier 340, and the second end of the first resistor R1 is connected to the output end of the transconductance amplifier 340. The second end of the second resistor R2 is connected to the input end of the first switch K1, the output end of the first switch K1 is connected to the output end of the transconductance amplifier 340, the control end of the first switch K1 is connected to the first end of the main control chip 330, a second end of the third resistor R3 is connected to the input end of the second switch K2, the output end of the second switch K2 is connected to the output end of the transconductance amplifier 340, and the control end of the second switch K2 is connected to a third end of the main control chip 330. It should be noted that when the control end and the output end of the first switch K1 are connected and the control end and the output end of the second switch K2 are connected, the variable feedback resistor circuit includes the first resistor R1, the second resistor R2, and the third resistor R3 connected in parallel. When the control end and the output end of the first switch K1 are disconnected and the control end and the output end of the second switch K2 are disconnected, the variable feedback resistor circuit includes the first resistor R1. When the control end and the output end of the first switch K1 are connected and the control end and the output end of the second switch K2 are disconnected, the variable feedback resistor circuit includes the first resistor R1 and the second resistor R2 connected in parallel.

The main control chip 350 dynamically adjusts the resistance value of the variable feedback resistor circuit by controlling the first switch K1 and the second switch K2 to be turned on or turned off, so that the voltage $U_{out}$ output by the transconductance amplifier 340 changes accordingly, and the optical power receiving range of the optical module is flexibly expanded.

Specifically, when the optical power value is not greater than the first power threshold P1, the main control chip 330 disconnects the control end of the first switch K1 from the output end of the first switch K1 and disconnects the control end of the second switch K2 from the output end of the second switch K2. When the optical power value is greater than the first power threshold P1 and is not greater than a second power threshold P2, the main control chip 330 connects the control end of the first switch K1 to the output end of the first switch K1 and disconnects the control end of the second switch K2 from the output end of the second switch K2. When the optical power value is greater than the second power threshold P2, the main control chip 330 connects the control end of the first switch K1 to the output end of the first switch K1 and connects the control end of the second switch K2 to the output end of the second switch K2. Details are shown in the following Table 1.

It should be noted that the first power threshold P1 and the second power threshold P2 are preset values, and specifically, the values may be flexibly set according to an actual situation. This is not specifically limited in this embodiment of the present invention.

TABLE 1

Switch setting status

| Optical power value | Status of the first switch K1 | Status of the second switch K2 |
| --- | --- | --- |
| P ≤ P1 | Disconnected | Disconnected |
| P1 < P ≤ P2 | Connected | Disconnected |
| P > P2 | Connected | Connected |

Optionally, the first switch K1 and the second switch K2 may be implemented by field-effect transistors. In this case, the first end of the first resistor R1, the first end of the second resistor, the first end of the third resistor are separately connected to the negative input end of the transconductance amplifier 340, the second end of the first resistor R1 is connected to the output end of the transconductance amplifier 340, the second end of the second resistor R2 is connected to a source of a field-effect transistor 1, a drain of the field-effect transistor 1 is connected to the output end of the transconductance amplifier 340, a gate of the field-effect transistor 1 is connected to the first end of the main control chip 350, the second end of the third resistor R3 is connected to a source of a field-effect transistor 2, a drain of the field-effect transistor 2 is connected to the output end of the transconductance amplifier 340, and a gate of the field-effect transistor 2 is connected to the third end of the main control chip 350 (the field-effect transistor 1 and the field-effect transistor 2 are not shown in FIG. 7).

Further, the main control chip 350 is specifically configured to control, according to a result of comparison between the optical power value and each of the first power threshold P1 and the second power threshold P2, the field-effect transistor 1 and the field-effect transistor 2 to be in a conducted state or a cut-off state. The second resistor R2 and the third resistor R3 are connected to the circuit in parallel by controlling the field-effect transistor 1 and the field-effect transistor 2 to be in a conducted state or a cut-off state.

For example, the main control chip 330 compares the optical power value of the received optical signal with the first power threshold and the second power threshold. When the optical power value is not greater than the first power threshold, the main control chip 330 sets the field-effect transistor 1 to a conducted state and sets the field-effect transistor 2 to a cut-off state. In this case, the second resistor R2 and the third resistor R3 are not connected to the first resistor R1 in parallel, and the first resistor R1 is used as the feedback resistor of the transconductance amplifier 340. When the optical power value is greater than the first power threshold and is not greater than the second power threshold, the main control chip sets the field-effect transistor 1 to a conducted state and sets the field-effect transistor 2 to a cut-off state. In this case, the second resistor R2 and the first resistor R1 are connected in parallel, and a combination of the first resistor R1 and the second resistor connected in parallel is used as the feedback resistor of the transconductance amplifier 340. When the optical power value is greater than the second power threshold, the main control chip 330 sets the field-effect transistor 1 and the field-effect transistor 2 to a conducted state. In this case, the first resistor R1, the second resistor R2, and the third resistor R3 are connected in parallel, and a combination of the first resistor R1, the second resistor R2, and the third resistor R3 connected in parallel is used as the feedback resistor of the transconductance amplifier 340.

Figure 8:
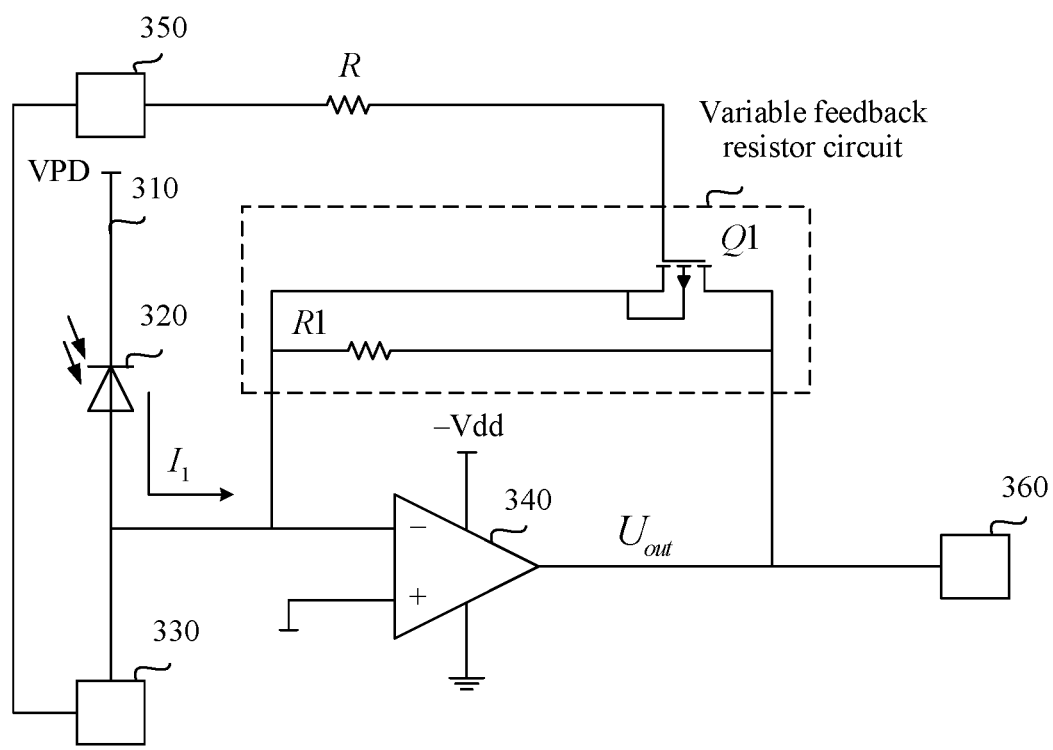
FIG. 8 is a circuit diagram of a receiving part of another optical module for dynamically adjusting an optical power receiving range according to an embodiment of the present invention.

FIG. 8 is a circuit diagram of a receiving part of another optical module for dynamically adjusting an optical power receiving range according to an embodiment of the present invention. FIG. 8 shows a detailed structure of the variable feedback resistor circuit based on FIG. 3. For a part that is the same as that in FIG. 3, refer to the description of FIG. 3. Details are not described herein again.

In this embodiment of the present invention, the variable feedback resistor circuit includes a first resistor R1 and a first field-effect transistor Q1.

Optionally, the first field-effect transistor Q1 includes a gate, a source, and a drain. The source of the first field-effect transistor Q1 and a first end of the first resistor R1 are separately connected to the negative input end of the transconductance amplifier 340, the drain of the first field-effect transistor Q1 and a second end of the first resistor R1 are separately connected to the output end of the transconductance amplifier 340, and the gate of the first field-effect transistor Q1 is connected to the first end of the main control chip 330.

It should be noted that in this embodiment of the present invention, the first field-effect transistor Q1 is in a partially conducted state. The gate of the first field-effect transistor Q1 in a partially conducted state is loaded with different voltages. The first field-effect transistor Q1 is equivalent to different resistance values. The variable feedback resistor circuit includes the first resistor R1 and a resistor equivalent to the first field-effect transistor Q1 that are connected in parallel.

The main control chip 350 loads different voltages into the gate of the first field-effect transistor Q1. In this way, the first field-effect transistor Q1 is equivalent to different resistance values, so that the resistance value of the variable feedback resistor circuit can be dynamically adjusted, and further, the voltage $U_{out}$ output by the transconductance amplifier 340 changes accordingly. Therefore, the optical power receiving range of the optical module can be expanded.

Specifically, when the optical power value is greater than a minimum optical power value $P_{min}$ in optical power values that can be obtained by the optical module, and is not greater than a first power threshold P1, the main control chip 330 outputs a voltage $V_{min}$ and loads the voltage $V_{min}$ into the gate of the first field-effect transistor Q1. The voltage $V_{min}$ is a minimum gate voltage value of the first field-effect transistor Q1. When the optical power value is greater than the first power threshold P1 and is not greater than a second power threshold P2, the main control chip 330 outputs a voltage V1 and loads the voltage V1 into the gate of the first field-effect transistor Q1. The voltage V1 is a gate voltage of the first field-effect transistor Q1. When the optical power value is greater than the second power threshold P2 and is not greater than a third power threshold P3, the main control chip 330 outputs a voltage V2 and loads the voltage V2 into the gate of the first field-effect transistor Q1. The voltage V2 is a gate voltage of the first field-effect transistor Q1. When the optical power value is greater than the third power threshold P3 and is not greater than a maximum optical power value $P_{max}$ in the optical power values that can be obtained by the optical module, the main control chip 330 outputs a voltage V3 and loads the voltage V3 into the gate of the first field-effect transistor Q1. The voltage V3 is a gate voltage of the first field-effect transistor Q1. When the optical power value is greater than the maximum optical power value $P_{max}$, the main control chip 330 outputs a voltage V4 and loads the voltage V4 into the gate of the first field-effect transistor Q1. The voltage V4 is a gate voltage of the first field-effect transistor Q1. Details are shown in the following Table 2.

TABLE 2

Correspondence table between the optical power value and a gate voltage Vg of the first field-effect transistor Q1

| Optical power value | Gate voltage Vg of the first field-effect transistor Q1 |
| --- | --- |
| $P_{min} < P \leq P1$ | $V_{min}$ |
| $P1 < P \leq P2$ | V1 |
| $P2 < P \leq P3$ | V2 |
| $P3 < P \leq P_{max}$ | V3 |
| $P_{max} < P$ | V4 |

As shown in Table 2, $P_{min}$ and $P_{max}$ are the minimum optical power value and the maximum optical power value in the optical power values that can be obtained by the optical module. $V_{min}$ is a minimum value of the gate voltage Vg of the first field-effect transistor Q1. V1, V2, V3, and V4 are preset gate voltages Vg of the first field-effect transistor Q1.

In this embodiment of the present invention, the main control chip 350 obtains the gate voltage of the first field-effect transistor Q1 by using the correspondence table between the optical power value and the gate voltage of the first field-effect transistor, so as to load the gate voltage of the first field-effect transistor. In this way, the first field-effect transistor is equivalent to a resistance value, so that the resistance value of the variable feedback resistor circuit is dynamically adjusted, the voltage output by the transconductance amplifier changes accordingly, and the optical power receiving range of the optical module is flexibly expanded. In addition, optical receiving sensitivity of the optical module can be increased, and a probability that optical receive power is saturated and optical receive power fails to be identified can be reduced.

It should be noted that the first power threshold P1, the second power threshold P2, and the third power threshold P3 are values preset at delivery, and specifically, the values may be flexibly set according to an actual situation. This is not specifically limited in this embodiment of the present invention.

Further, the main control chip 330 includes components such as a processor, a transceiver, and a memory (not shown in FIG. 8). The processor implements various functions of the main control chip, the transceiver implements communication with another component, and the memory is configured to store program code. The processor outputs a digital signal after comparing the optical power value with a power threshold.

The main control chip 330 further includes a digital-to-analog converter (not shown in FIG. 8). The digital-to-analog converter is configured to convert the digital signal output by the processor into an analog signal. The analog signal carries the gate voltage that is of the first field-effect transistor Q1 and that is determined by the main control chip.

Further, the optical module further includes a fixed resistor R. A first end of the fixed resistor R is connected to the first end of the main control chip 330, and a second end of the fixed resistor R is connected to the gate of the first field-effect transistor Q1. The fixed resistor R may be configured to maintain a constant voltage of the analog signal output by the main control chip.

In this embodiment of the present invention, the first field-effect transistor Q1 may be replaced with a plurality of field-effect transistors. The plurality of field-effect transistors form a black box, and the main control chip 330 adjusts a resistor represented by the black box.

It may be understood that the correspondence table between the optical power value and the gate voltage Vg of the first field-effect transistor Q1 is set before delivery according to a preset optical power receiving range of the optical module.

The following briefly describes a process of setting the correspondence table between the optical power value and the gate voltage Vg of the first field-effect transistor Q1 provided in this embodiment of the present invention.

The foregoing embodiment describes in detail a manner of setting the first resistor R1 and the power threshold, and details are not described herein again.

It is assumed that there are a plurality of optical power values, and levels of the optical power values are obtained after the plurality of optical power values are compared with a plurality of power thresholds. A resistance value range that is of the variable feedback resistor circuit and that is corresponding to a level of each optical power value is determined according to a maximum input voltage value $U_{out\_max}$, a maximum current value $I_{max}$, a minimum input voltage value $U_{out\_min}$, and a minimum current value $I_{min}$, and then a corresponding equivalent resistor R' of the first field-effect transistor Q1 is determined according to the determined resistance value range of the variable feedback resistor circuit and the first resistor R1. A gate voltage that is of the first field-effect transistor Q1 and that is corresponding to the equivalent resistor R' of the first field-effect transistor Q1 is determined according to the equivalent resistor R' of the first field-effect transistor Q1, so as to obtain the correspondence table between the optical power value and the gate voltage Vg of the first field-effect transistor Q1.

In this embodiment of the present invention, a range of optical signals that can be received by the optical module is determined, that is, the minimum optical power value $P_{min}$ to the maximum optical power value $P_{max}$ in the optical power values that can be obtained by the optical module are determined. The minimum current value $I_{min}$ corresponding to the minimum optical power value and the maximum current value $I_{max}$ corresponding to the maximum optical power value $P_{max}$ are obtained by means of querying according to the minimum optical power value $P_{min}$ and the maximum optical power value $P_{max}$. $I_{max}$ and $I_{min}$ may be obtained from delivery data of an optical component, or current distribution data may be obtained by means of actual measurement.

The optical module can normally receive an optical signal in the range $[P_{min}, P_{max}]$, and obtain an optical power value of the optical signal. A maximum input voltage value $U_{out\_max}$ and a minimum input voltage value $U_{out\_min}$ that can be identified by the limiting amplifier 360 are determined, so that the voltage $U_{out}$ output by the transconductance amplifier 340 meets $U_{out\_min} < U_{out} < U_{out\_max}$.

The resistance value range of the variable feedback resistor circuit is determined according to the maximum input voltage value $U_{out\_max}$, the maximum current value $I_{max}$, the minimum input voltage value $U_{out\_min}$, and the minimum current value $I_{min}$. The resistance value of the variable feedback resistor circuit is a parallel resistance value of the first resistor R1 and the equivalent resistor R' of the first field-effect transistor Q1. In this case, the equivalent resistor R' of the first field-effect transistor Q1 can be determined.

In this embodiment of the present invention, the equivalent resistor R' of the first field-effect transistor Q1 meets the following formula 7.

$$R' = \frac{1}{2*k*(Vgs - Vp)} \qquad \text{formula 7}$$

k is a physical parameter of the first field-effect transistor Q1 and is determined by a specific structure and doping density of the first field-effect transistor Q1, Vp is a threshold enabling voltage of the first field-effect transistor Q1 and is determined by a specific structure, insulated gate thickness, a substrate, and source and drain doping density of the first field-effect transistor Q1, and Vgs is a difference between a gate voltage and a source voltage of the first field-effect transistor Q1.

A differential input end of the transconductance amplifier 340 is characterized by virtual short-circuit. Therefore, the source voltage of the first field-effect transistor Q1 is equal to a sum of an input end voltage and a reference voltage Vref that are of the transconductance amplifier 340, and is a fixed value.

More precisely, the equivalent resistor R' of the first field-effect transistor Q1 may meet the following formula 8:

$$R' = \frac{1}{2*k*(Vg - Vref - Vp)} \qquad \text{formula 8}$$

Vg is the gate voltage of the first field-effect transistor Q1, and Vref is the reference voltage of the transconductance amplifier 340.

Therefore, the gate voltage Vg of the first field-effect transistor Q1 may be obtained by using the foregoing formula 8 according to the equivalent resistor R' of the first field-effect transistor Q1.

In view of the above, the correspondence table between the optical power value and the gate voltage Vg of the first field-effect transistor Q1 may be obtained.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

What is claimed is:

1. An optical module for dynamically adjusting an optical power receiving range, wherein the optical module comprises an optical signal receive end, a transconductance amplifier, and an avalanche photodiode, and wherein the optical module further comprises a main control chip, an optical power detection module, and a variable feedback resistor circuit;
   wherein the optical signal receive end is connected to a negative electrode of the avalanche photodiode, wherein a positive electrode of the avalanche photodiode is separately connected to a first end of the optical power detection module and a negative input end of the transconductance amplifier, and wherein a positive input end of the transconductance amplifier is grounded;
   wherein the variable feedback resistor circuit is connected between the negative input end and an output end that are of the transconductance amplifier, wherein a first end of the main control chip is connected to the variable feedback resistor circuit, and wherein a second end of the main control chip is connected to a second end of the optical power detection module;
   wherein the optical signal receive end is configured to:
      receive an optical signal; and
      transmit the optical signal to the avalanche photodiode;
   wherein the avalanche photodiode is configured to:
      convert the received optical signal into an optical current; and
      transmit the optical current to the optical power detection module and the transconductance amplifier;
   wherein the optical power detection module is configured to:
      obtain, according to the received optical current, an optical power value corresponding to the optical current; and
      transmit the optical power value to the main control chip;
   wherein the main control chip is configured to adjust a resistance value of the variable feedback resistor circuit according to the received optical power value; and
   wherein the transconductance amplifier is configured to output a voltage according to the resistance value of the variable feedback resistor circuit and the optical current.

2. The optical module of claim 1, wherein the variable feedback resistor circuit comprises a first field-effect transistor and a first resistor, and wherein the first field-effect transistor is set to a partially conducted state; and
   wherein a source of the first field-effect transistor and a first end of the first resistor are separately connected to the negative input end of the transconductance amplifier, wherein a drain of the first field-effect transistor and a second end of the first resistor are separately connected to the output end of the transconductance amplifier, and wherein a gate of the first field-effect transistor is connected to the first end of the main control chip.

3. The optical module of claim 2, wherein the main control chip is configured to:
   obtain a correspondence table between the optical power value and a gate voltage of the first field-effect transistor;

obtain the gate voltage of the first field-effect transistor according to the correspondence table; and load the obtained gate voltage into the gate of the first field-effect transistor.

4. The optical module of claim 2, wherein the circuit further comprises a fixed resistor, and wherein a first end of the fixed resistor is connected to the first end of the main control chip, and wherein a second end of the fixed resistor is connected to the gate of the first field-effect transistor.

5. The optical module of claim 1, wherein the variable feedback resistor circuit comprises a first resistor, a second resistor, and a first switch, and wherein the first switch is configured to control a status of a connection between the second resistor and the first resistor; and wherein a first end of the first resistor and a first end of the second resistor are separately connected to the negative input end of the transconductance amplifier, wherein a second end of the first resistor is connected to the output end of the transconductance amplifier, wherein a second end of the second resistor is connected to an input end of the first switch, wherein an output end of the first switch is connected to the output end of the transconductance amplifier, and wherein a control end of the first switch is connected to the first end of the main control chip.

6. The optical module of claim 5, wherein the main control chip is configured to:

determine whether the optical power value is greater than a preset first power threshold; and in response to determining that the optical power value is greater than the first power threshold, connect the control end of the first switch to the output end of the first switch.

7. The optical module of claim 6, wherein the switch is a second field-effect transistor;

wherein the first end of the first resistor is connected to the negative input end of the transconductance amplifier, wherein the second end of the first resistor is connected to the output end of the transconductance amplifier, wherein the first end of the second resistor is connected to the negative input end of the transconductance amplifier, wherein the second end of the second resistor is connected to a source of the second field-effect transistor, wherein a drain of the second field-effect transistor is connected to the output end of the transconductance amplifier, and wherein a gate of the second field-effect transistor is connected to the first end of the main control chip; and wherein the main control chip is configured to:

determine whether the optical power value is greater than the preset first power threshold; and in response to determining that the optical power value is greater than the first power threshold, set the second field-effect transistor to a conducted state.

8. The optical module of claim 6, wherein the switch is a second field-effect transistor;

wherein the first end of the first resistor is connected to the negative input end of the transconductance amplifier, wherein the second end of the first resistor is connected to the output end of the transconductance amplifier, wherein the first end of the second resistor is connected to the negative input end of the transconductance amplifier, wherein the second end of the second resistor is connected to a source of the second field-effect transistor, wherein a drain of the second field-effect transistor is connected to the output end of the transconductance amplifier, and wherein a gate of the second field-effect transistor is connected to the first end of the main control chip; and wherein the main control chip is configured to:

determine whether the optical power value is greater than the preset first power threshold; and in response to determining that the optical power value is not greater than the first power threshold, set the second field-effect transistor to a cut-off state.

9. The optical module of claim 5, wherein the main control chip is configured to:

determine whether the optical power value is greater than a preset first power threshold; and in response to determining that the optical power value is not greater than the first power threshold, disconnect the control end of the first switch from the output end of the switch.

10. The optical module of claim 5, wherein the switch is a second field-effect transistor;

wherein the first end of the first resistor is connected to the negative input end of the transconductance amplifier, wherein the second end of the first resistor is connected to the output end of the transconductance amplifier, wherein the first end of the second resistor is connected to the negative input end of the transconductance amplifier, wherein the second end of the second resistor is connected to a source of the second field-effect transistor, wherein a drain of the second field-effect transistor is connected to the output end of the transconductance amplifier, and wherein a gate of the second field-effect transistor is connected to the first end of the main control chip; and wherein the main control chip is configured to:

determine whether the optical power value is greater than a preset first power threshold; and in response to determining that the optical power value is not greater than the first power threshold, set the second field-effect transistor to a cut-off state.

11. The optical module of claim 5, wherein the variable feedback resistor circuit further comprises a third resistor and a second switch, and wherein the second switch is configured to control a status of a connection between the third resistor and each of the first resistor and the second resistor; and wherein a first end of the third resistor is separately connected to the first end of the first resistor, the first end of the second resistor, and the negative input end of the transconductance amplifier, wherein the second end of the first resistor is connected to the output end of the transconductance amplifier, wherein the second end of the second resistor is connected to the input end of the first switch, wherein the output end of the first switch is connected to the output end of the transconductance amplifier, wherein the control end of the first switch is connected to the first end of the main control chip, wherein a second end of the third resistor is connected to an input end of the second switch, wherein an output end of the second switch is connected to the output end of the transconductance amplifier, and wherein a control end of the second switch is connected to a third end of the main control chip.

12. The optical module of claim 11, wherein the main control chip is configured to:

determine a value relationship between the optical power value and each of a preset first power threshold and a preset second power threshold;

in response to determining that the optical power value is not greater than the first power threshold, disconnect the control end of the first switch from the output end of the first switch, and disconnect the control end of the second switch from the output end of the second switch; and in response to determining that the optical power value is greater than the first power threshold and not greater than the second power threshold, connect the control end of the first switch to the output end of the switch, and disconnect the control end of the second switch from the output end of the second switch, in response to determining that the optical power value is greater than the first power threshold and not greater than the second power threshold.

13. The optical module of claim 12, wherein the main control chip is configured to:

determine a value relationship between the optical power value and each of a preset first power threshold and a preset second power threshold;

in response to determining that the optical power value is not greater than the first power threshold, disconnect the control end of the first switch from the output end of the first switch, and disconnect the control end of the second switch from the output end of the second switch, when; and in response to determining that optical power value is greater than the second power threshold, connect the control end of the first switch to the output end of the first switch, and connect the control end of the second switch to the output end of the second switch.

14. The optical module of claim 13, wherein the first switch is a second field-effect transistor, and the second switch is a third field-effect transistor;

wherein the first end of the first resistor, the first end of the second resistor, and the first end of the third resistor are separately connected to the negative input end of the transconductance amplifier, wherein the second end of the first resistor is connected to the output end of the transconductance amplifier, wherein the second end of the second resistor is connected to a source of the second field-effect transistor, wherein a drain of the second field-effect transistor is connected to the output end of the transconductance amplifier, wherein a gate of the second field-effect transistor is connected to the first end of the main control chip, wherein the second end of the third resistor is connected to a source of the third field-effect transistor, wherein a drain of the third field-effect transistor is connected to the output end of the transconductance amplifier, and wherein a gate of the third field-effect transistor is connected to the third end of the main control chip; and wherein the main control chip is configured to:

determine the value relationship between the optical power value and each of a preset first power threshold and a preset second power threshold;

in response to determining that the optical power value is not greater than the first power threshold, set the second field-effect transistor to a cut-off state, and set the third field-effect transistor to a cut-off state; and in response to determining that the optical power value is greater than the second power threshold, set the second field-effect transistor to a conducted state, and set the third field-effect transistor to a conducted state.

15. The optical module of claim 11, wherein the first switch is a second field-effect transistor, and the second switch is a third field-effect transistor;

wherein the first end of the first resistor, the first end of the second resistor, and the first end of the third resistor are separately connected to the negative input end of the transconductance amplifier, wherein the second end of the first resistor is connected to the output end of the transconductance amplifier, wherein the second end of the second resistor is connected to a source of the second field-effect transistor, wherein a drain of the second field-effect transistor is connected to the output end of the transconductance amplifier, wherein a gate of the second field-effect transistor is connected to the first end of the main control chip, wherein the second end of the third resistor is connected to a source of the third field-effect transistor, wherein a drain of the third field-effect transistor is connected to the output end of the transconductance amplifier, and wherein a gate of the third field-effect transistor is connected to the third end of the main control chip; and wherein the main control chip is configured to:

determine the value relationship between the optical power value and each of the preset first power threshold and the preset second power threshold;

in response to determining that the optical power value is not greater than the first power threshold, set the second field-effect transistor to a cut-off state, and set the third field-effect transistor to a cut-off state; and in response to determining that the optical power value is greater than the first power threshold and not greater than the second power threshold, set the second field-effect transistor to a conducted state, and set the third field-effect transistor to a cut-off state.

16. An optical line terminal (OLT), wherein the OLT comprises the optical module for dynamically adjusting an optical power receiving range, wherein the optical module comprises an optical signal receive end, a transconductance amplifier, and an avalanche photodiode, and wherein the optical module further comprises a main control chip, an optical power detection module, and a variable feedback resistor circuit;

wherein the optical signal receive end is connected to a negative electrode of the avalanche photodiode, wherein a positive electrode of the avalanche photodiode is separately connected to a first end of the optical power detection module and a negative input end of the transconductance amplifier, and wherein a positive input end of the transconductance amplifier is grounded;

wherein the variable feedback resistor circuit is connected between the negative input end and an output end that are of the transconductance amplifier, wherein a first end of the main control chip is connected to the variable feedback resistor circuit, and wherein a second end of the main control chip is connected to a second end of the optical power detection module;

wherein the optical signal receive end is configured to:

receive an optical signal; and transmit the optical signal to the avalanche photodiode;

wherein the avalanche photodiode is configured to:

convert the received optical signal into an optical current; and transmit the optical current to the optical power detection module and the transconductance amplifier;

wherein the optical power detection module is configured to:
  obtain, according to the received optical current, an optical power value corresponding to the optical current; and
  transmit the optical power value to the main control chip;
wherein the main control chip is configured to adjust a resistance value of the variable feedback resistor circuit according to the received optical power value; and
wherein the transconductance amplifier is configured to output a voltage according to the resistance value of the variable feedback resistor circuit and the optical current.

17. An optical network unit (ONU), wherein the ONU comprises the optical module for dynamically adjusting an optical power receiving range, wherein the optical module comprises an optical signal receive end, a transconductance amplifier, and an avalanche photodiode, and wherein the optical module further comprises a main control chip, an optical power detection module, and a variable feedback resistor circuit;
  wherein the optical signal receive end is connected to a negative electrode of the avalanche photodiode, wherein a positive electrode of the avalanche photodiode is separately connected to a first end of the optical power detection module and a negative input end of the transconductance amplifier, and wherein a positive input end of the transconductance amplifier is grounded;
  wherein the variable feedback resistor circuit is connected between the negative input end and an output end that are of the transconductance amplifier, wherein a first end of the main control chip is connected to the variable feedback resistor circuit, and wherein a second end of the main control chip is connected to a second end of the optical power detection module;
  wherein the optical signal receive end is configured to:
    receive an optical signal; and
    transmit the optical signal to the avalanche photodiode;
  wherein the avalanche photodiode is configured to:
    convert the received optical signal into an optical current; and
    transmit the optical current to the optical power detection module and the transconductance amplifier;
  wherein the optical power detection module is configured to:
    obtain, according to the received optical current, an optical power value corresponding to the optical current; and
    transmit the optical power value to the main control chip;
  wherein the main control chip is configured to adjust a resistance value of the variable feedback resistor circuit according to the received optical power value; and
  wherein the transconductance amplifier is configured to output a voltage according to the resistance value of the variable feedback resistor circuit and the optical current.

* * * * *